United States Patent
Lee et al.

(10) Patent No.: US 11,994,625 B2
(45) Date of Patent: May 28, 2024

(54) LIDAR DEVICE AND OPERATING METHOD THEREOF

(71) Applicant: SAMSUNG ELECTRONICS CO., LTD., Suwon-si (KR)

(72) Inventors: Jisan Lee, Suwon-si (KR); Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 997 days.

(21) Appl. No.: 16/782,779

(22) Filed: Feb. 5, 2020

(65) Prior Publication Data
US 2021/0055392 A1    Feb. 25, 2021

(30) Foreign Application Priority Data

Aug. 20, 2019    (KR) .......... 10-2019-0101870

(51) Int. Cl.
*G01S 7/4865*    (2020.01)
*G01S 7/48*    (2006.01)
(Continued)

(52) U.S. Cl.
CPC .......... *G01S 7/4866* (2013.01); *G01S 7/4808* (2013.01); *G01S 7/484* (2013.01); *G01S 17/26* (2020.01)

(58) Field of Classification Search
CPC ...... G01S 7/4866; G01S 7/4808; G01S 7/484; G01S 17/26; G01S 7/4811; G01S 7/4814;
(Continued)

(56) References Cited

U.S. PATENT DOCUMENTS 4,928,131 A * 5/1990 Onozawa ................ G01S 7/024
342/159
10,132,928 B2    11/2018 Eldada et al.
(Continued)

FOREIGN PATENT DOCUMENTS

JP    2018-180116 A    11/2018
JP    2018-200273 A    12/2018

OTHER PUBLICATIONS

Wikipedia contributors. "Cross-correlation." Wikipedia, The Free Encyclopedia. Wikipedia, The Free Encyclopedia, Mar. 18, 2023. Web. Apr. 4, 2023 (Year: 2023).*
(Continued)

*Primary Examiner* — Isam A Alsomiri
*Assistant Examiner* — Sanjida Naser
(74) *Attorney, Agent, or Firm* — Sughrue Mion, PLLC

(57) ABSTRACT

A light detection and ranging (LiDAR) device may include: an optical phased array configured to modulate a phase of light incident on the optical phased array and emit the light; a first photodetector configured to detect, as a reference light, the light emitted from the optical phased array in a first direction toward the first photodetector, and generate a reference signal based on the reference light; a second photodetector configured to detect, as a target light including information about an object, the light emitted from the optical phased array in a second direction toward the object, and generate a target signal based on the target light; and a processor configured to determine a distance between the LiDAR device and the object based on a cross-correlation between the reference signal and the target signal.

17 Claims, 15 Drawing Sheets

(51) Int. Cl.
G01S 7/484 (2006.01)
G01S 17/26 (2020.01)

(58) Field of Classification Search
CPC .... G01S 7/4817; G01S 7/4818; G01S 7/4868;
G01S 7/4915; G01S 7/4865; G01S 17/10;
G01S 17/89; G01S 17/931; G01S 17/08;
G01S 7/481; G01S 7/4863; G02B 26/08;
G02B 27/10
See application file for complete search history.

(56) References Cited

U.S. PATENT DOCUMENTS

| | | | | |
|---|---|---|---|---|
| 2014/0376001 | A1* | 12/2014 | Swanson | G02B 6/29302 356/479 |
| 2015/0293224 | A1 | 10/2015 | Eldada et al. | |
| 2015/0378187 | A1* | 12/2015 | Heck | G02F 1/292 250/227.21 |
| 2017/0082746 | A1 | 3/2017 | Kubota et al. | |
| 2017/0242108 | A1 | 8/2017 | Dussan et al. | |
| 2017/0328990 | A1* | 11/2017 | Magee | G01S 17/931 |
| 2017/0363740 | A1 | 12/2017 | Kubota et al. | |
| 2018/0017671 | A1 | 1/2018 | Warke et al. | |
| 2018/0024412 | A1* | 1/2018 | Kim | G02F 1/0018 359/315 |
| 2018/0107091 | A1 | 4/2018 | Hosseini et al. | |
| 2018/0156661 | A1* | 6/2018 | Doylend | G01B 11/22 |
| 2018/0188452 | A1 | 7/2018 | Sun et al. | |
| 2018/0189977 | A1 | 7/2018 | Zecchini et al. | |
| 2018/0267152 | A1 | 9/2018 | McMichael et al. | |
| 2018/0306907 | A1 | 10/2018 | Pacala et al. | |
| 2018/0306908 | A1 | 10/2018 | Meng et al. | |
| 2019/0179064 | A1 | 6/2019 | Zhang et al. | |
| 2019/0285796 | A1* | 9/2019 | Waldern | G02B 27/0081 |
| 2019/0293770 | A1* | 9/2019 | Subasingha | G01S 7/4873 |

OTHER PUBLICATIONS

Communication dated Oct. 2, 2020 issued by the European Patent Office in European Application No. 20160149.9.
Hutchison et al., "High-resolution aliasing-free optical beam steering", Optica, vol. 3, No. 8, Aug. 2016, pp. 887-890, 4 pages total.
Communication dated Jan. 18, 2021 issued by the European Patent Office in European Application No. 20160149.9.
Communication dated Jun. 16, 2023 by the European Patent Office in European Application No. 20160149.9.

* cited by examiner

LIDAR DEVICE AND OPERATING METHOD THEREOF

CROSS-REFERENCE TO RELATED APPLICATION

This application claims priority Korean Patent Application No. 10-2019-0101870, filed on Aug. 20, 2019, in the Korean Intellectual Property Office, the disclosure of which is incorporated herein by reference in its entirety.

BACKGROUND

1. Field

Apparatuses and methods consistent with example embodiments relate to a light detection and ranging (LiDAR) device and an operating method thereof.

2. Description of the Related Art

A light detection and ranging (LiDAR) device is being employed in various fields, for example, aerospace, geology, 3D maps, vehicles, robots, or drones. A basic operation principle for LiDAR devices is a time of flight (ToF) of light. For example, a LiDAR device may transmit light toward an object and receive the light through a sensor, thereby measuring a ToF by using a high-speed electric circuit. Furthermore, a LiDAR device may calculate a distance to an object based on the ToF and generate a depth image of the object using the distance calculated for each position of the object.

In order for a LiDAR device to accurately process a depth image even in an environment where noise exists or a target signal is a small signal, a technology to accurately measure a ToF of light may be demanded.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a light detection and ranging (LiDAR) device which uses light emitted from an optical phased array as a reference light, and an operating method thereof.

According to an aspect of an embodiment, there is provided a light detection and ranging (LiDAR) device including: an optical phased array configured to modulate a phase of light incident on the optical phased array and emit the light; a first photodetector configured to detect, as a reference light, the light emitted from the optical phased array in a first direction toward the first photodetector, and generate a reference signal based on the reference light; a second photodetector configured to detect, as a target light including information about an object, the light emitted from the optical phased array in a second direction toward the object, and generate a target signal based on the target light; and a processor configured to determine a distance between the LiDAR device and the object based on a cross-correlation between the reference signal and the target signal.

The LiDAR device may further include a substrate on which the first photodetector and at least part of the optical phased array are disposed.

The optical phased array and the first photodetector may be disposed on a same surface of the substrate.

The LiDAR device may further include a waveguide configured to receive the reference light from the optical phased array and output the reference light to the first photodetector.

The waveguide may include an area having a width that decreases from the optical phased array toward the first photodetector.

The waveguide may include an input coupler configured to allow the reference light received from the optical phased array to be coupled the waveguide, and an output coupler configured to output the reference light that passed through the waveguide to the first photodetector.

The input coupler may include a plurality of sub-input couplers disposed to correspond to respective antennas of the optical phased array.

The waveguide may be disposed on a substrate where at least part of the optical phased array is disposed.

The waveguide may include an optical fiber.

The optical fiber may be bonded to a substrate on which at least part of the optical phased array is disposed.

The optical phased array may include: an optical splitter configured to split the light incident on the optical phased array, into a plurality of sub-lights; a phase modulation array configured to modulate a phase of each of the plurality of sub-lights; and an antenna array configured to emit the plurality of sub-lights that are modulated by the phase modulation array.

The optical phased array may include an electrode layer, an active layer disposed on the electrode layer, an insulating layer disposed on the active layer, and an antenna layer disposed on the insulating layer, wherein the active layer may be disposed between the electrode layer and the antenna layer, and configured to have a resonance characteristic that varies according to a voltage applied between the electrode layer and the antenna layer.

The processor may determine a distance between the LiDAR device and the object based on a time difference between a first point in time at which the reference signal is detected and a second point in time at which a cross-correlation function value indicating the cross-correlation between the reference signal and the target signal is greater than or equal to a reference value.

The reference value may be a maximum value of the cross-correlation function value.

When the target signal is f(t) and the reference signal is g(t), the cross-correlation function may be determined by a mathematical expression $\int_{-\infty}^{\infty} f(x)g(t+x)dx$.

The LiDAR device may further include an analog-to-digital converter (ADC) configured to quantize each of the reference signal and the target signal.

The processor may be configured to convert the reference signal and the target signal into unipolar signals based on an absolute value of at least one of the reference signal and the target signal.

According to another aspect of an embodiment, there is provided an operating method of a light detection and ranging (LiDAR) device, including: emitting light that is phase-modulated by an optical phased array; detecting, by a photodetector, the light emitted from the optical phased array in a first direction toward a photodetector, as reference light; detecting, by the photodetector, the light emitted from the optical phased array in a second direction toward an object, as a target light including information about the object; generating a reference signal based on the reference light, and generating a target signal based on the target light; and determining a distance between the optical phased array and the object based on a cross-correlation between the reference signal and the target signal.

The operating method may further include transferring the reference light toe photodetector by using a waveguide.

The determining the distance comprises, determining a distance between the LiDAR device and the object based on a time difference between a first point in time at which the reference signal is detected and a second point in time at which a cross-correlation function value indicating the cross-correlation between the reference signal and the target signal is greater than or equal to a reference value.

The reference value may be a maximum value of the cross-correlation function value.

The operating method may further include quantizing each of the reference signal and the target signal.

The operating method may further include converting the reference signal and the target signal into unipolar signals based on an absolute value of at least one of the reference signal and the target signal.

According to an aspect of another example embodiment, there is provided a distance sensing device including: a light emitter configured to emit light in a first direction toward an object and in a second direction different from the first direction; a light receiver configured to detect the light emitted to the object and reflected from the object as an analog target signal, and detect, directly from the light emitter, the light emitted in the light second direction as an analog reference signal; an analog-to-digital converter (ADC) configured to convert the analog target signal and the analog reference signal to a digital target signal and a digital reference signal, respectively; and a processor configured to determine a distance between the distance sensing device and the object based on information of a time point at which a cross-correlation between the digital target signal and the digital reference signal is maximized.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
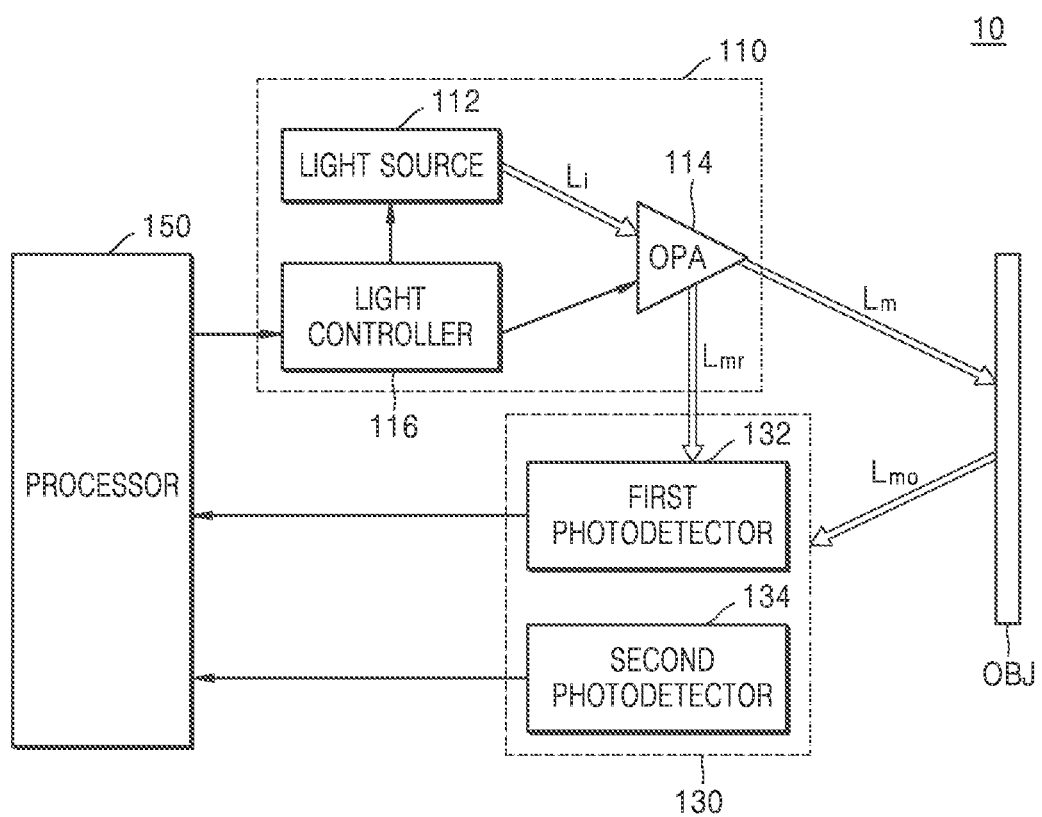
FIG. 1 is a schematic block diagram of a configuration of a LiDAR device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The terms used in the present disclosure have been selected from currently widely used general terms in consideration of the functions in the present disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the present disclosure are defined based on their meanings in relation to the contents discussed throughout the specification, not by their simple meanings.

In the present specification, when a constituent element "connects" or is "connected" to another constituent element, the constituent element contacts or is connected to the other constituent element not only directly, but also electrically through at least one of other constituent elements interposed therebetween. As used herein, the singular forms "a," "an" and "the" are intended to include the plural forms as well, unless the context clearly indicates otherwise. Furthermore, it will be further understood that the terms "comprises" and/or "comprising" used herein specify the presence of stated features or components, but do not preclude the presence or addition of one or more other features or components.

Also, terms such as "include" or "comprise" may not be construed to include necessarily all constituent element or operations set forth in the specification. However, the terms may not be construed to exclude another constituent element or operation but may be construed to further include other constituent elements or operations.

However, no limitation of the scope of the disclosure is intended by the following descriptions, and the disclosure should be construed to encompass all embodiments that would normally occur to one of ordinary skill in the art. Hereinafter, the present disclosure will be described in detail by explaining preferred embodiments of the disclosure with reference to the attached drawings.

FIG. 1 is a schematic block diagram of a configuration of a LiDAR device 10 according to an example embodiment Referring to FIG. 1, the LiDAR device 10 may include a light transmitter (or a light emitter) 110, a light receiver 130, and a processor 150. The light transmitter 110 may transmit light Lm in a direction toward an object OBJ by modulating the phase of the light Lm. The light receiver 130 may receive part of the light LM emitted from the light transmitter 110 as reference light Lmr and light reflected from the object OBJ, that is, light including information about the object OBJ, as target light Lmo. Alternatively, the light transmitter 110 may transmit the same light Lm in two different directions, the direction toward the object OBJ and the direction toward the light receiver 130, wherein the light Lm that is transmitted from the light transmitter 110 to the light receiver 130 is referred to as the reference light Lmr. The processor 150 may determine a distance between the light transmitter 110 and the object OBJ by using an electrical signal corresponding to the reference light Lmr (hereinafter, referred to as the "reference signal") and an electrical signal corresponding to the target light Lmo (hereinafter, referred to as the "target signal").

The light transmitter 110 may include a light source 112 for emitting light, an optical phased array 114 for emitting light by modulating the phase of light emitted from the light source 112, and a light controller 116 for controlling the light source 112 and the optical phased array 114.

The light source 112 may radiate light in an infrared range. When light in the infrared range is used, mixing with natural light in a visible range including the sunlight may be prevented. However, the present disclosure is not limited thereto, and the light transmitter 110 may include a light source for radiating light in various wavelength bands and may radiate light in a plurality of different wavelength bands. Furthermore, the light transmitter 110 may radiate pulse light or continuous light.

The light source 112 may include a light source such as a laser diode (LD), an edge emitting laser, a vertical-cavity surface emitting laser (VCSEL), a distributed feedback laser, a light emitting diode (LED), or a super luminescent diode (SLD). However, the present disclosure is not limited thereto.

The optical phased array 114 may emit light modulated in a specific direction by modulating the phase of incident light.

Figure 2:
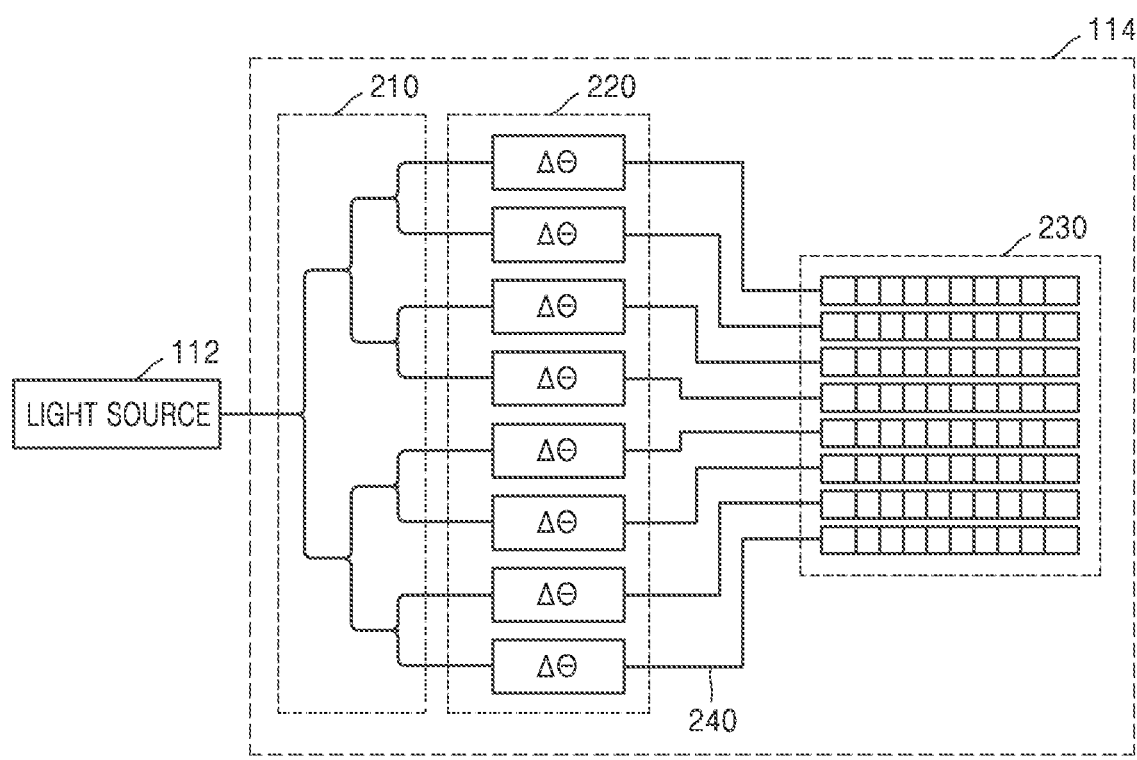
FIG. 2 is a conceptual diagram of an optical phased array according to an example embodiment.

FIG. 2 is a conceptual diagram of the optical phased array 114 according to an example embodiment. As illustrated in FIG. 2, the optical phased array 114 may include an optical splitter 210 for splitting incident light into a plurality of sub-lights, an optical phase modulation array 220 for modulating the phase of each of the split sub-lights, and an antenna array 230 for emitting the phase-modulated sub-lights as modulated light. The optical splitter 210, the optical phase modulation array 220, and the antenna array 230 are connected to one another by a waveguide 240.

As described above, as the optical phased array 114 may adjust the direction of light without a mechanical movement, precise and fast control may be available. However, the optical phased array 114 may have a loss as the incident light passes through the optical phased array 114. In detail, optical loss is generated as the incident light travels through the optical splitter 210, the optical phase modulation array 220, the antenna array 230, and the waveguide 240. In general, the optical phased array 114 may have a loss of about 10 db of output light compared with input light. Weak power of the light output from the optical phased array 114 may decrease in the range of a distance measured by the light receiver 130 and the accuracy of a measurement distance.

The light receiver 130 of the LiDAR device 10 according to an example embodiment may include a first photodetector 132 that receives the light output from the optical phased array 114 of the light transmitter 110, as the reference light Lmr, and a second photodetector 134 that detects the target light Lm reflected from the object OBJ. The target light Lmo may include information about the object OBJ. The first photodetector 132 may output a reference (electrical) signal corresponding to the reference light Lmr, and the second photodetector 134 may output a target (electrical) signal corresponding to the target light Lmo.

The first and second photodetectors 132 and 134 may be light receiving elements for converting light to an electrical signal. For example, the first and second photodetectors 132 and 134 may include at least one of an avalanche photodiode (APD) or a single photo avalanche diode (SPAD), but the present disclosure is not limited thereto.

The processor 150 may determine a distance between the LiDAR device 10 and the object OBJ by using a cross-correlation between the reference signal corresponding to the reference light Lmr and the target signal corresponding to the target light Lmo.

The reference signal is a result of detection of the light output from the optical phase modulation array 220, and the target signal is a result of detection of the light reflected from the object OBJ of the light output from the optical phase modulation array 220. The reference signal and the target signal may have the same as or extremely similar to each other. Accordingly, when a time point when a cross-correlation between the target signal and the reference signal increases is detected, a time when the light output from the light transmitter 110 is received by the light receiver 130 may be determined.

For example, the processor 150 may use a cross-correlation function between the target signal and the reference signal. A cross-correlation function is a function indicating a degree of a cross-correlation between two functions, and thus the cross-correlation function between the target signal and the reference signal may output a value proportional to the cross-correlation between the two signals. For example, assuming that the target signal is y(t) and the reference signal is x(t), a cross-correlation function (Rxy(t)) between the target signal and the reference signal may be calculated by Equation 1.

$$Rxy(t)=x(t)\otimes y(t)=\int_{-\infty}^{\infty}x(\tau)\cdot y(t+\tau)d\tau \quad \text{[Equation 1]}$$

As the cross-correlation function is a result of quantitative calculation of similarity between the target signal and the reference signal, when the reference signal has a time delay as much as the ToF of light, the reference signal may have the most similar shape to the target signal.

The processor 150 may determine, as the ToF of light, a time from a time point when the reference signal is detected to a time point when a value of a cross-correlation function between the reference signal and the target signal is greater than or equal to a reference value. For example, the reference value may be a preset value or the maximum value of the cross-correlation function.

Figure 3:
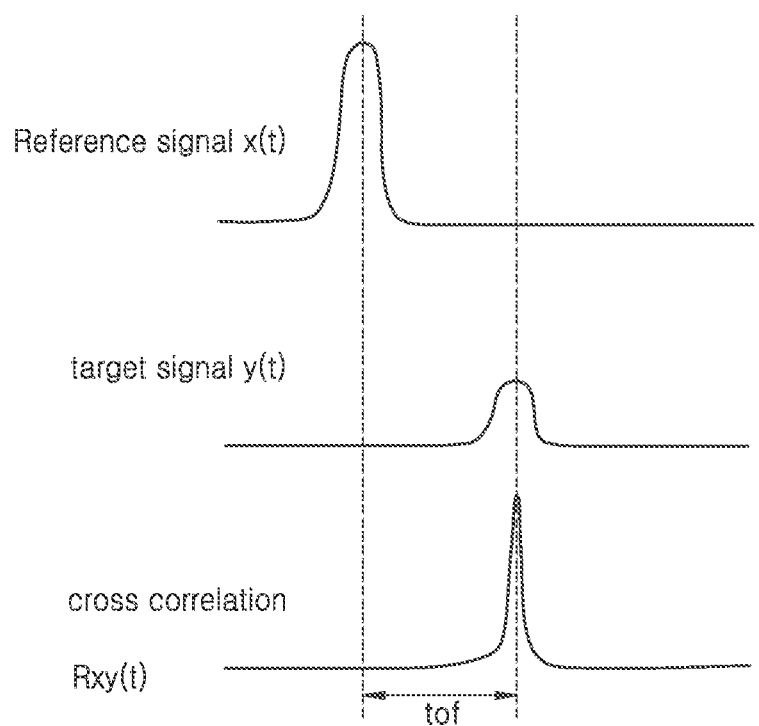
FIG. 3 is a reference drawing showing a relationship between a ToF and a cross-correlation between a reference signal and a target signal, according to an example embodiment.

FIG. 3 is a reference drawing showing a relationship between a ToF and a cross-correlation between a reference signal and a target signal, according to an example embodiment.

As illustrated in FIG. 3, the first photodetector 132 may detect the reference light Lmr at a first time point and output a reference signal x(t) as illustrated in (i) of FIG. 3. The second photodetector 134 may detect the target light Lmo at a second time point and output a target signal y(t) as illustrated in (ii) of FIG. 3. The processor 150 may determine a cross-correlation function value as illustrated in (iii) of FIG. 3, by applying a cross-correlation function Rxy(t) to the reference signal x(t) and the target signal y(t). Even when the target signal y(t) or reference signal x(t) is weak, the cross-correlation function value of the cross-correlation function Rxy(t) is greater in the amplitude than the target signal y(t). Thus, the processor 150 may easily determine a time point when the cross-correlation function value is greater than or equal to the reference value.

Figure 4:
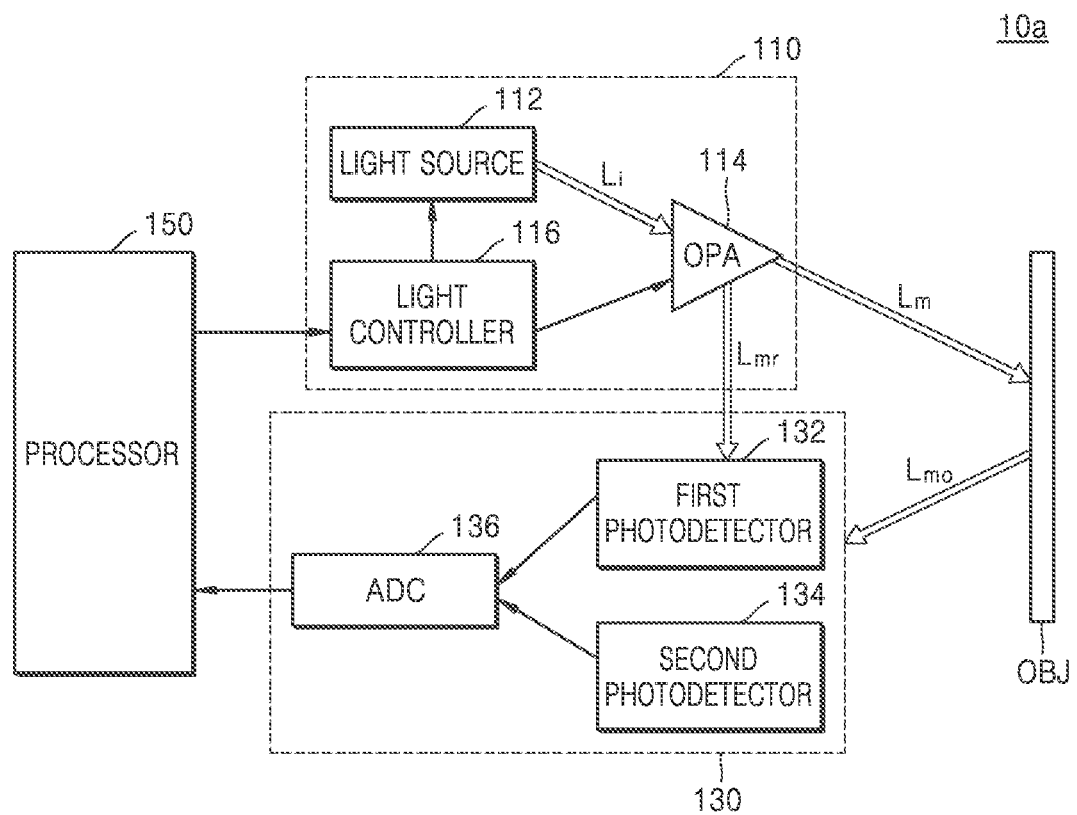
FIG. 4 is a block diagram of a LiDAR device according to another example embodiment.

FIG. 4 is a block diagram of a LiDAR device 10a according to another example embodiment. Referring to FIGS. 1 and 4, the LiDAR device 10a of FIG. 4 may further include an analog-to-digital converter 136 for quantizing each of the reference signal and the target signal respectively output from the first and second photodetectors 132 and 134. Alternatively, the LiDAR device 10 may further include a high-pass filter for removing offset from the reference signal and the target signal and an amplifier (AMP) for amplifying the reference signal and the target signal.

When the light receiver 130 includes the analog-to-digital converter 136, the processor 150 may receive a target signal (xk) and a reference signal (yi+k) that are quantized by the analog-to-digital converter 136, and obtain a cross-correlation function (Rxyi) between the target signal and the reference signal by using Equation 2.

$$R_{xyi} = \sum_{k=0}^{N-1} x_k y_{i+k}, \, i = -(N-1), -(N-2), \quad \text{[Equation 2]}$$
$$\ldots, -1, 0, 1, \ldots, (N-2), (N-1)$$

In detail, the processor 150 may produce a ToF of light using a sampling rate S of the analog-to-digital converter 136 and a time index $i_{max}$ when a result of calculation of a cross-correlation function is maximum. For example, the processor 150 may determine $2i_{max}/S$ to be the ToF of light, and a distance between the optical phased array 114 and the object OBJ to be $2ci_{max}/S$, where c is the velocity of light.

Alternatively, the cross-correlation function Rxy(t) between the target signal y(t) and the reference signal x(t) may be produced through a fast Fourier transform. The fast Fourier transform may greatly reduce the number of calculations for signal processing.

Figure 5A:
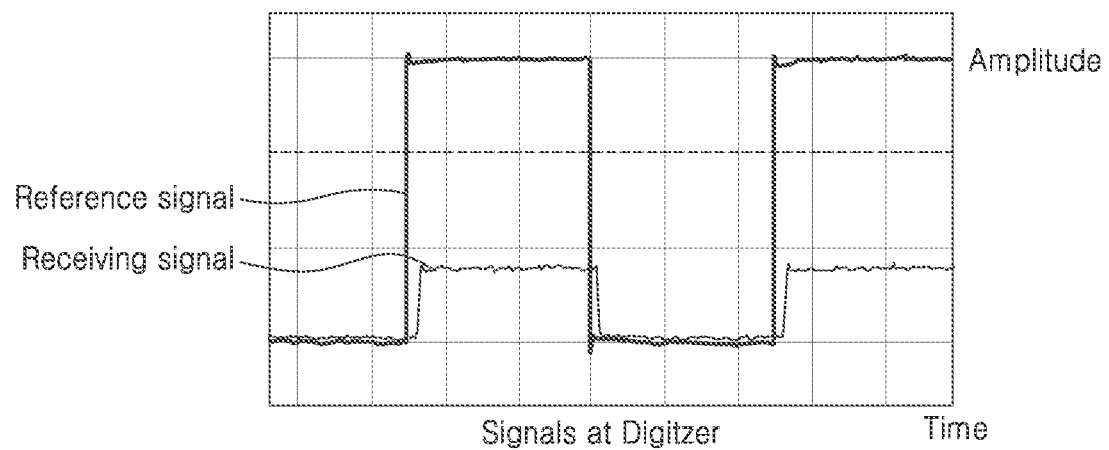
FIG. 5A is a graph showing a simulation result with respect to a reference signal and a target signal output from an analog-to-digital converter, according to an example embodiment.
Figure 5B:
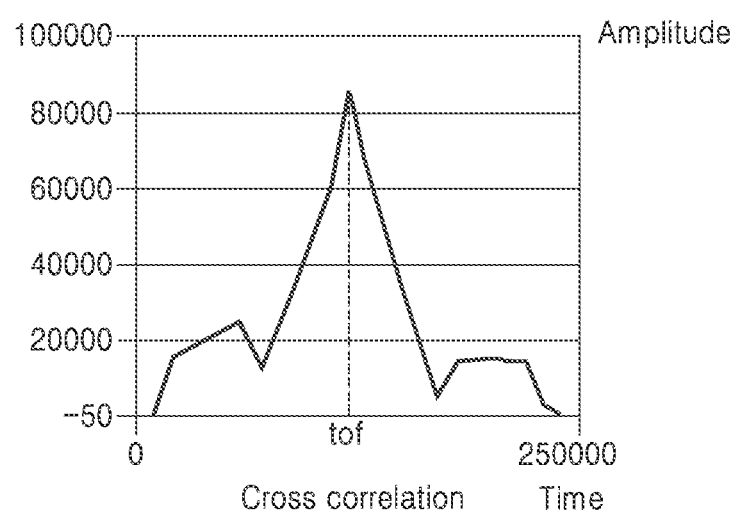
FIG. 5B is a graph showing a result of applying a cross-correlation function to the output signals of FIG. 5A.

FIG. 5A is a graph showing a simulation result with respect to a reference signal and a target signal output from the analog-to-digital converter 136, according to an example embodiment. FIG. 5B is a graph showing a result of applying a cross-correlation function to the output signals of FIG. 5A. A modulation frequency for a simulation is 100 kHz, and pulse light having a duty ratio of about 50% is used. The analog-to-digital converter 136 having a bandwidth of about 1.5 GHz and a sampling rate of about 1.25 GHz is used.

As illustrated in FIG. 5A, it may be seen that the target signal (i.e., receiving signal) output from the analog-to-digital converter 136 has a slight time delay compared with the reference signal. It may be seen that a large peak range of the reference signal and the target signal is formed. Accordingly, it may be expected that the time delay between the two signals may be inaccurately determined. As a result of applying a cross-correlation function to the target signal and the reference signal, as illustrated in FIG. 5B, it may be seem that the peak of the signal is sharp. It may be expected that accuracy of the time delay between the two signals increases.

Figure 6:
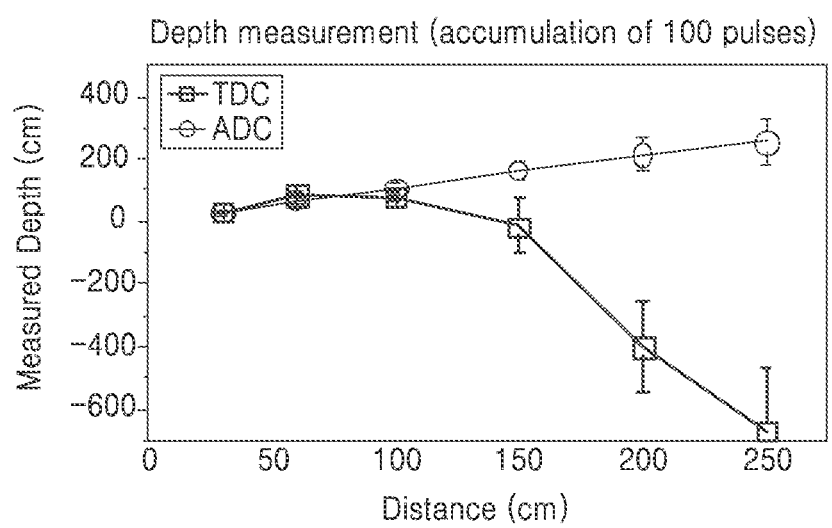
FIG. 6 is a graph showing a simulation result when calculating a ToF of light using an ADC and a time digital counter (TDC)

FIG. 6 is a graph showing a simulation result when calculating a ToF of light using an ADC and a time digital counter (TDC). As a result of measuring a distance to the object OBJ using the ADC and the cross-correlation function, it may be seen that a distance to the object OBJ disposed 150 cm or more away is measured. In contrast, as a result of measuring a distance to the object OBJ using the TDC, it may be seen that a distance to the object OBJ disposed 150 cm or more away has a distorted distance measurement mean value, and moreover, it is difficult to measure a distance due to a large error range.

As the reference signal is based on the light output from the light transmitter 110, there is no need to consider the time consumed as the light passes through the light source 112 and the optical phased array 114. When a modulation signal of the light controller 116 is used as a reference signal, temporal noise, for example, jitter, which may be generated when light is modulated by the light source 112, may be included in the cross-correlation function. However, as the reference signal according to an example embodiment uses the light output from the light transmitter 110, the temporal noise or jitter are removed. Accordingly, accuracy of the measurement of the ToF of light may be further improved.

Furthermore, even when the intensity of light output from the light transmitter 110 and the intensity of light detected by the light receiver 130 are weak, accuracy in the measurement of a distance may be improved by employing the cross-correlation function because the reference light Lmr and the target light Lmo have similar characteristics.

When negative values are included in signal values indicating the target signal or the reference signal due to noise or oscillation, an amplification effect by the cross-correlation function calculation may be reduced. To prevent the reduction of the amplification effect by the cross-correlation function calculation due to noise or oscillation, the processor 150 may convert each of the target signal and the reference signal to a unipolar signal. A unipolar signal, which is opposite to a bipolar signal, may denote a signal having signal values of any one of negative and positive polarities.

The processor 150 may convert the reference signal and the target signal respectively to a unipolar reference signal and a unipolar target signal based on the absolute value of the reference signal and at least some of the target signals. Alternatively, the processor 150 may convert the target signal and the reference signal into unipolar signals by using a method other than the above method of using the absolute value. For example, the processor 150 may convert the target signal and the reference signal into unipolar signals by using a method of replacing signal values having a value less than a specific value, where the value is greater than or equal to 0, among signal values indicating the target signal or the reference signal, or convert the target signal and the reference signal into unipolar signals by using a method of squaring signal values indicating the target signal or the reference signal.

The processor 150 may calculate a cross-correlation function between the target signal and the reference signal that are converted into unipolar signals, and determine a time point when a calculated value of the cross-correlation function is greater than or equal to the reference value, for example, a time point when the value of a cross-correlation function is the maximum, thereby determining a time from the time point when the reference signal is detected to a time point when the value of a cross-correlation function is maximum to be a ToF of light. A distance from the light transmitter 110 to the object OBJ may be determined by using the ToF and the velocity of light.

Furthermore, according to another example embodiment, when there is no time point when a calculated value of the cross-correlation function exceeds a preset critical value, the processor 150 may control the light transmitter 110 to radiate a laser pulse multiple times toward the object OBJ, obtain a plurality of target signals from laser pulses reflected from the object OBJ, and detect a ToF of the laser pulse by using the obtained target signals. The processor 150 may increase the number of populations including the target signals through a plurality of measurements, and perform noise cancellation by using a technique such as averaging. Accordingly, a receiving time point of the reflected laser pulse may be accurately detected even in a noisy environment.

Figure 7:
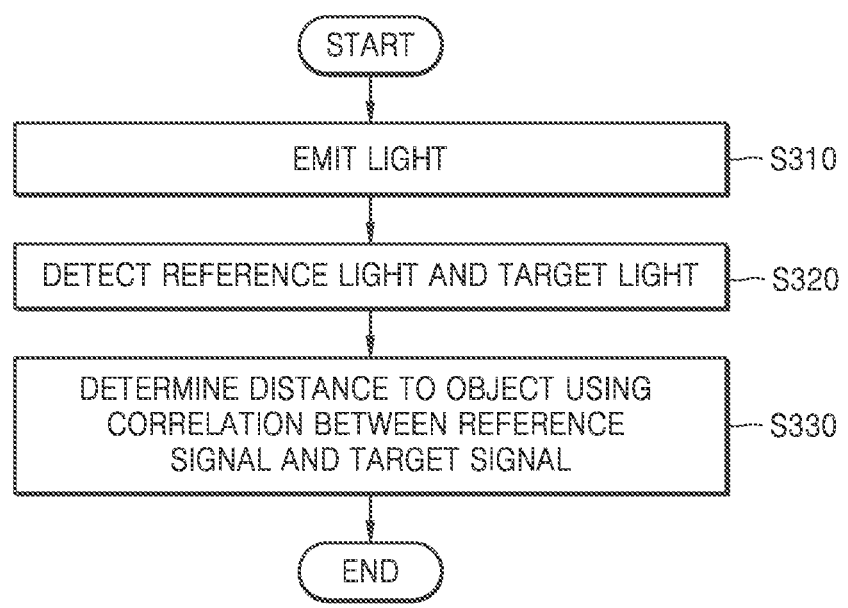
FIG. 7 is a flowchart of an operating method of a LiDAR device using reference light, according to an example embodiment.

FIG. 7 is a flowchart of an operating method of the LiDAR device 10 using the reference light Lmr, according to an example embodiment.

The light transmitter 110 may emit light in operation S310. Under the control of the light controller 116, the light source 112 may provide light of a specific frequency to the optical phased array 114, and the optical phased array 114, under the control of the light controller 116, may modulate the phase of incident light and emit the light in a specific direction. The light source 112 may include a light source such as a laser diode (LD), an edge emitting laser, a vertical-cavity surface emitting laser (VCSEL), a distributed feedback laser, a light emitting diode (LED), or a super luminescent diode (SLD). However, the present disclosure is not limited thereto.

The optical phased array 114 may include the optical splitter 210 for splitting incident light into a plurality of sub-lights, the phase modulation array 220 for modulating the phase of each of the split sub-lights, and the antenna array 230 for emitting light in a specific direction by emitting a plurality of phase-modulated sub-light. The optical phased array 114 may include a nanostructure.

The light receiver 130 may detect the light output from the optical phased array 114, as the reference light Lmr, and the light reflected from the object OBJ of the light output from the optical phased array 114, as the target light Lmo, in operation S320. For example, the first photodetector 132 may detect the light output from the optical phased array 114 as the reference light Lmr, and the second photodetector 134 may detect the light reflected from the object OBJ, as the target light Lmo including information about the object OBJ. The first photodetector 132 and the second photodetector 134 may be sensors different from each other or one sensor. The first and second photodetectors 132 and 134 may include at least one of an APD or an SPAD, but the present disclosure is not limited thereto.

The processor 150 may determine a distance between the optical phased array 114 and the object OBJ by using a cross-correlation between the reference signal and the target signal corresponding to the target light Lmo, in operation S330. The processor 150 may determine a time from a time point when a reference signal is detected to a time point when the value of a cross-correlation function between the reference signal and the target signal is greater than or equal to a reference value, to be the ToF of light. The processor 150 may determine a distance between the LiDAR device 10 and the object OBJ by using the velocity of light and the ToF of light.

The reference signal is a result of detecting the light output from the optical phase modulation array 220, and the target signal is a result of the light reflected from the object OBJ of the light output from the optical phase modulation array 220. The reference signal and the target signal may have the same or very similar characteristics. Accordingly, even when the target signal or the reference signal is weak, the processor 150 may obtain a cross-correlation function value having a large amplitude by applying the cross-correlation function to the reference signal and the target signal. A time point of the cross-correlation function value that is greater than or equal to the reference value may be used for the determination of the ToF of light. The light receiver 130 may use an analog-to-digital converter.

Furthermore, the processor 150 may convert each of the target signal and the reference signal to a unipolar signal to prevent the reduction of the amplification effect by the cross-correlation function calculation due to noise or oscillation, determine a ToF of light by applying the cross-correlation function to the unipolar reference signal and the unipolar target signal, and determine a distance between the LiDAR device 10 and the object OBJ by using the ToF of light and the velocity of light.

According to another example embodiment, when there is no time point when the calculated value of the cross-correlation function is greater than or equal to the reference value, the processor 150 may control the light transmitter 110 to radiate laser pulses multiple times toward the object OBJ, obtain a plurality of target signals from laser pulses reflected from the object OBJ, and detect a ToF of the laser pulse by using the obtained target signals. The processor 150 may increase the number of populations including the target signals through a plurality of measurements, and perform noise cancellation by using a technique such as averaging. Accordingly, a receiving time point of the reflected laser pulse may be accurately detected even in a noisy environment.

The above-described operating method of the LiDAR device 10 may be recorded on a computer-readable recording medium having recorded thereon one or more programs including instructions for executing the method. An example of the computer-readable recording medium may include magnetic media such as hard discs, floppy discs, or magnetic tapes, optical media such as CD-ROM or DVD, magneto-optical media such as floptical disks, and hardware devices such as ROM, RAM, or flash memory, which are specially configured to store and execute a program command. An example of a program command may include not only machine codes created by a compiler, but also high-level programming language executable by a computer using an interpreter.

Figure 8:
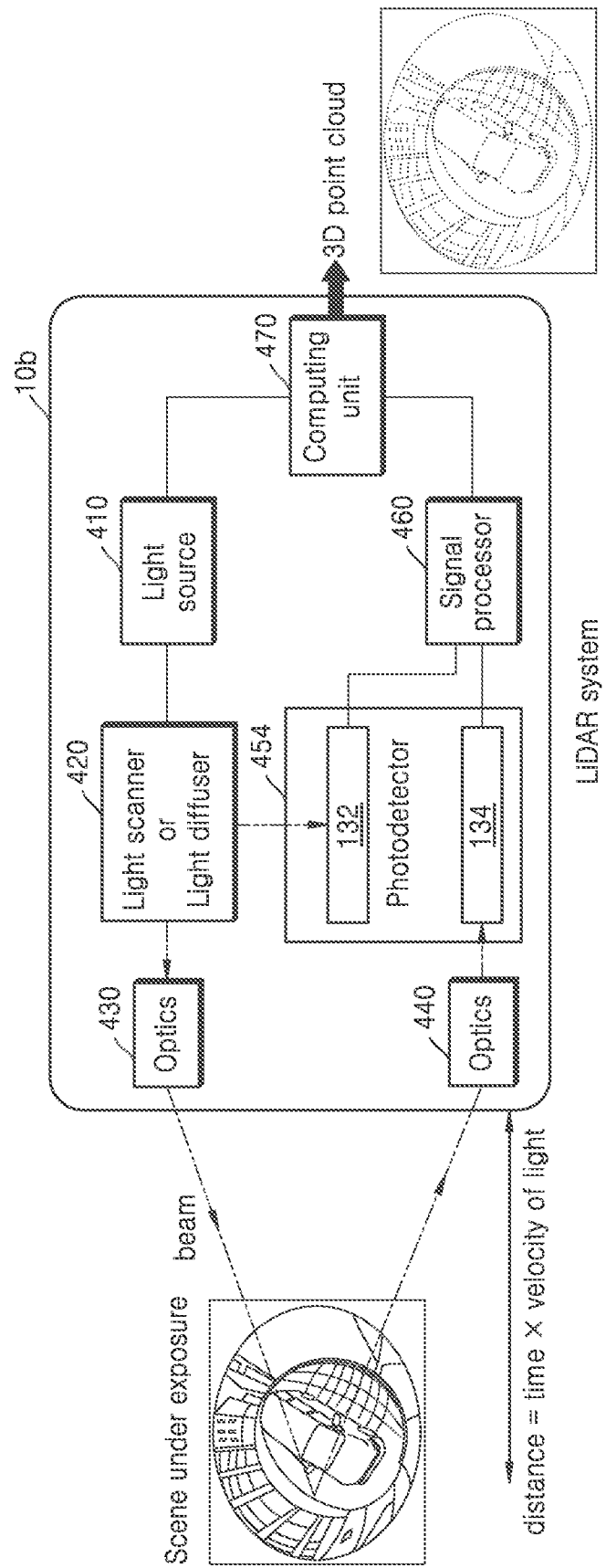
FIG. 8 is a block diagram of another example of a LiDAR device according to another example embodiment.

FIG. 8 is a block diagram of another example of a LiDAR device 10*b* according to another example embodiment.

In an example, the LiDAR device 10*b* may be a LiDAR system provided in an autonomous vehicle or a vehicle adopting advanced driver assistance systems (ADAS). However, the present disclosure is not limited thereto, and the LiDAR device 10b may be applied to various fields, for example, aerospace, geology, 3D maps, robots, or drones. The LiDAR device 10b may obtain information about a scene or landscape of exposed surroundings by using a laser beam, and may form a 3D point cloud regarding the scene or landscape of exposed surroundings based on the obtained information.

Referring to FIG. 8, the LiDAR device 10b may include a light source 410, a light scanner or light diffuser 420, a first optical lens 430, a second optical lens 440, a photodetector 450, a signal processor 460, and a computing unit 470. The light source 410, the light scanner or light diffuser 420, and the first optical lens 430 of FIG. 8 may correspond to the light transmitter 110 of FIG. 1, the second optical lens 440 and the photodetector 450 of FIG. 8 may correspond to the light receiver 130 of FIG. 1, and the signal processor 460 and the computing unit 470 of FIG. 8 may correspond to the processor 150 of FIG. 1. Redundant descriptions thereof are omitted.

The light source 410 may include a plurality of light sources, and may radiate light to be used for analysis of the location or shape of the object OBJ. The light source 410 may generate and radiate light of a certain wavelength, for example, light of a wavelength band suitable for analysis of the location or shape of the object OBJ. The light source 410 may generate and radiate a plurality of lights having different wavelength bands. Furthermore, the light source 410 may generate and radiate pulse light or continuous light.

The light source 410 may radiate light toward the object OBJ, under the control of the processor 150. For example, the processor 150 may set radiation direction or an radiation angle of light from each of the light sources, and control the light source 410 such that the light sources radiate light according to each set radiation angle or direction. The processor 150, which controls an overall operation of the LiDAR device 10b, may correspond to the processor 150 of FIG. 1.

The light scanner or light diffuser 420 may aim the light from the light source 410 to the object OBJ so that point light from the light source 410 scans the entire object OBJ by time-sequentially adjusting an aiming direction. A scanning mirror or an optical phased array may be used as the light scanner or light diffuser 420. The aimed light from the light scanner or light diffuser 420 may be radiated toward the object OBJ through the first optical lens 430. The reflected light from the object OBJ may be received by the photodetector 450 through the second optical lens 440.

The first photodetector 132 may detect the aimed light from the light scanner or light diffuser 420 as the reference light Lmr. The second photodetector 134 may include a plurality of pixelated areas capable of distinguishably detecting the reflected light from the object OBJ according to the position. For example, the second photodetector 134 may include a detector array sectioned by a plurality of pixels. Light detection elements may be arranged at each of the pixels. The light detection elements, which are sensors capable of sensing light, may include, for example, light receiving elements that generate electrical signals from light energy. The light detection elements may form pixels that are sectioned according to the positions in the detector array, and each pixel may detect the reflected light from the object OBJ according to the radiation angle of the light from the light source 410.

The signal processor 460 and the computing unit 470 may calculate a ToF of light from the reflected light detected by the photodetector 450. As a detailed method in which the signal processor 460 and the computing unit 470 calculate the ToF of light is described with reference to FIG. 1, a redundant description thereof is omitted. The signal processor 460 and the computing unit 470 may calculate a distance to the object OBJ from the ToF, and generate a depth image or 3D point cloud regarding the object OBJ by using the distance calculated for each position of the object OBJ.

The first photodetector 132 detects the light output from the light transmitter 110, and the first photodetector 132 may be disposed close to the light transmitter 110. For example, the first photodetector 132 may be disposed on a substrate on which the optical phased array 114 is arranged.

Figure 9:
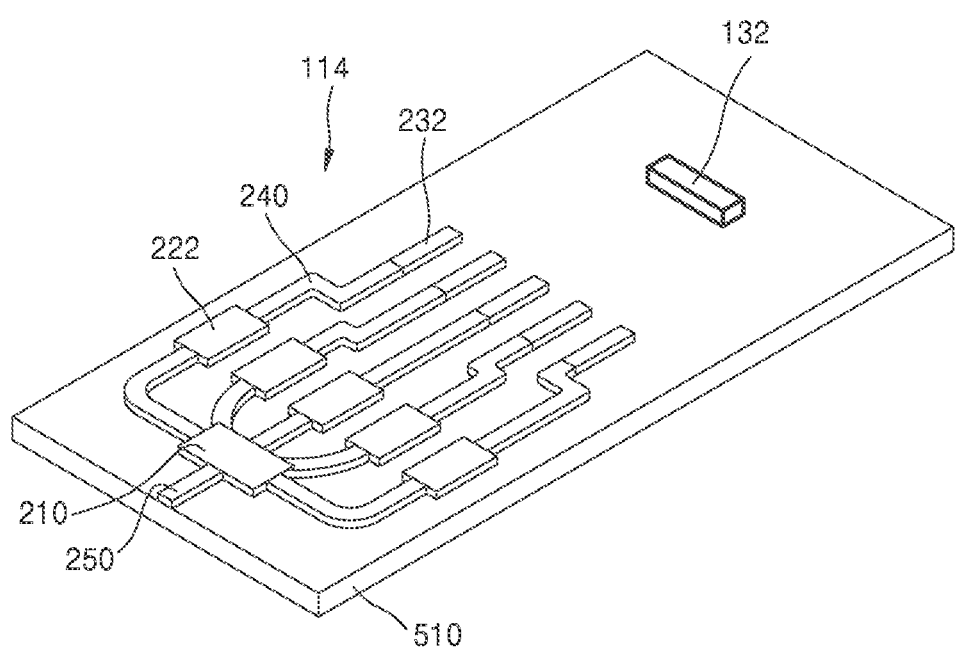
FIG. 9 is a perspective view of an arrangement relationship between a first photodetector and an optical phased array, according to an example embodiment.

FIG. 9 is a perspective view of an arrangement relationship between the first photodetector 132 and the optical phased array 114, according to an example embodiment. The optical phased array 114 may include, on the substrate 510, one or more optical splitters 210, a plurality of phase modulators 222, and a plurality of antennas 232. The phase modulators 222 of FIG. 9 may correspond to the optical phase modulation array 220 of FIG. 2, and the antennas 232 of FIG. 9 may correspond to the antenna array 230 of FIG. 2. An insulating layer may be optionally provided on the substrate 510, and an input coupler 250, the optical splitter 210, the phase modulators 222, and the antennas 232 may be provided on the insulating layer. Furthermore, a waveguide (s) 240 may be provided between two adjacent elements, that is, between the input coupler 250 and the optical splitter 210, between the optical splitter 210 and the phase modulators 222, and between the phase modulators 222 and the antennas 232.

The optical splitter 210 may have, for example, a multimode interference (MMI) structure or various other structures. The phase modulators 222 may have a structure to perform optical modulation in an electric manner, or other structures, for example, structure that performs light modulation by a magnetic method, a thermal method, or a mechanical method. Furthermore, the phase modulators 222 may take various modulation methods such as phase modulation or amplitude modulation. The phase modulators 222 may include a plurality of waveguides 240 and may perform optical modulation on the lights that pass through the waveguides 240. The antennas 232 may include, for example, a plurality of waveguides 240 and may further include a grating structure formed on each of the waveguides 240. Detailed structures of the input coupler 250, the optical splitter 210, the phase modulators 222, and the antennas 232 are not limited to the above descriptions, and may be changed in various ways.

At least one of the input coupler 250, the optical splitter 210, the phase modulators 222, or the antennas 232 may include at least one of group IV materials such as Si or Ge, compounds containing group IV materials such as SiGe, group III-V compounds, oxides, nitrides, or polymers. As necessary, at least two elements of the input coupler 250, the optical splitter 210, the phase modulators 222, or the antennas 232 may include materials different from each other. When the substrate 510 includes silicon Si, or at least one of the input coupler 250, the optical splitter 210, the phase modulators 222, or the antennas 232 includes Si, the optical phased array 114 according to the present example embodiment may be implemented/manufactured by using technology in the field of "silicon photonics". The silicon photonics technology may be advantageous in terms of ease of process because the technology is compatibly used together with a complementary metal oxide semiconductor (CMOS) process.

Although the optical phased array 114 is illustrated to be arranged on the substrate 510, the present disclosure is not limited thereto. A part of the optical phased array 114 may be disposed on the substrate 510.

The first photodetector 132 for detecting reference light may be disposed on the substrate 510 where the optical phased array 114 is disposed. The first photodetector 132 may be disposed on the same surface of the substrate 510 on which the optical phased array 114 is disposed.

Figure 10:
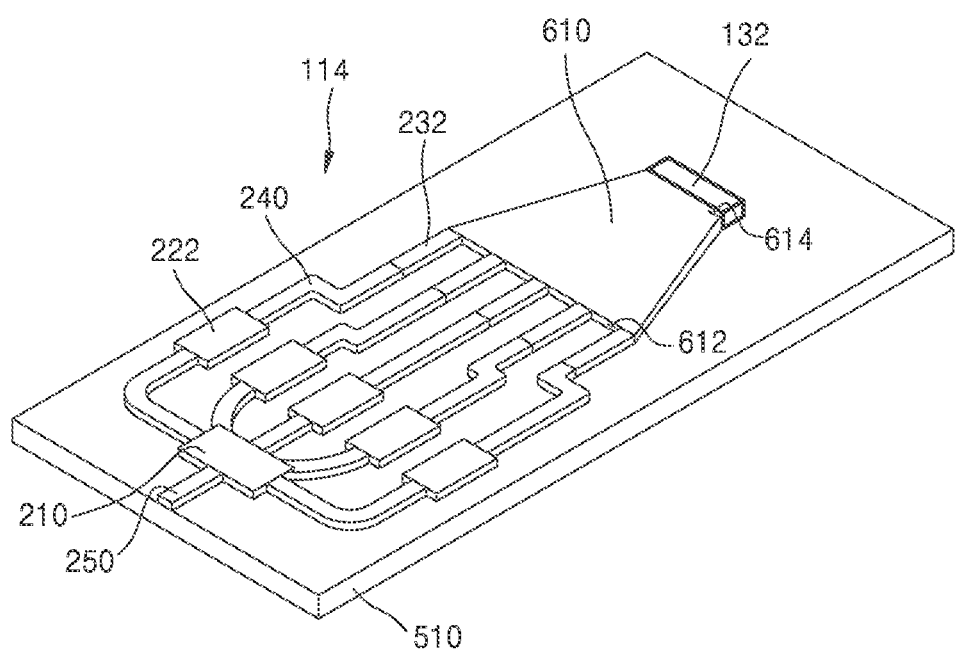
FIG. 10 is a perspective view of an arrangement relationship between the first photodetector and the optical phased array, according to another example embodiment.

FIG. 10 is a perspective view of an arrangement relationship between the first photodetector 132 and the optical phased array 114, according to another example embodiment. A waveguide 610 for receiving reference light that is part of the light emitted from the antenna array 230 and outputting the received reference light to the first photodetector 132 may be further disposed on the substrate 510. An input coupler 612 for inputting the reference light received from the antenna array 230 to the waveguide 610 and an output coupler 614 for outputting the reference light passed that through the waveguide 610 to the first photodetector 132 may be disposed on the waveguide 610. The first photodetector 132 may be disposed on the substrate 510 to face the antenna array 230. The cross-section of the waveguide 610 may have a shape having a width that narrows from the input coupler 612 to the output coupler 614. Accordingly, the optical density of the reference light incident on the first photodetector 132 may be increased.

Figure 11:
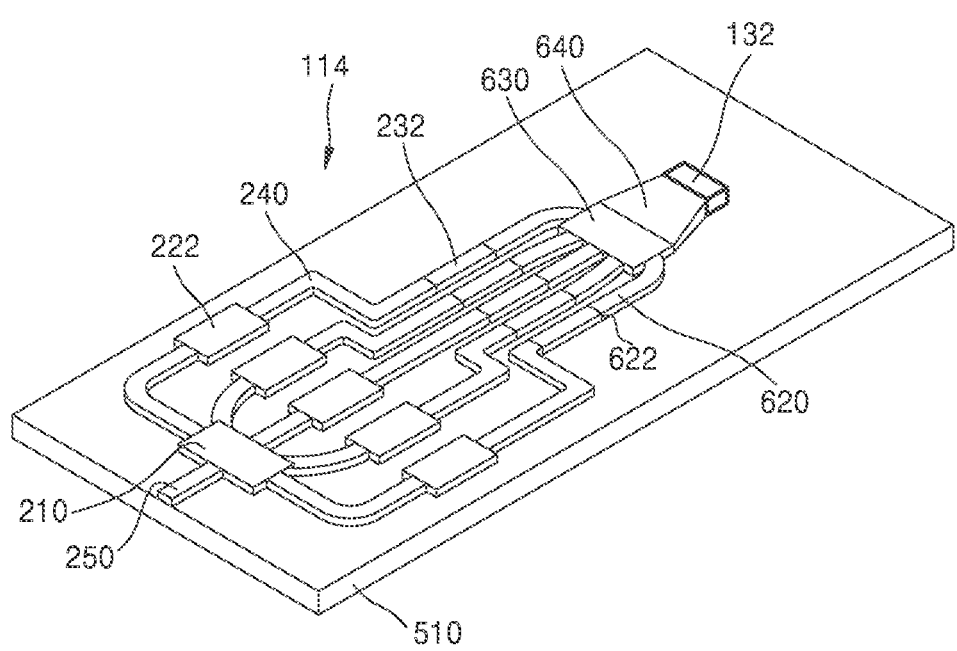
FIG. 11 is a perspective view of an arrangement relationship between the first photodetector and the optical phased array, according to another example embodiment.

FIG. 11 is a perspective view of an arrangement relationship between the first photodetector 132 and the optical phased array 114, according to another example embodiment. As illustrated in FIG. 11, a plurality of sub-waveguides 620 for receiving sub-light output from each of the antennas 232 of the antenna array 230, an optical coupler 630 for coupling a plurality of sub-lights, and a waveguide 640 for transferring the coupled light to the first photodetector 132 may be disposed on the substrate 510. Each of the sub-waveguides 620 may include a sub-input coupler 622 for receiving each of the sub-lights output from the antennas 232. A plurality of sub-lights coupled by the optical coupler 630 may be reference light.

As illustrated in FIGS. 10 and 11, as the waveguides 610, 620, and 640 for transferring the reference light to the first photodetector 132 are disposed on the substrate 510, the position where the first photodetector 132 is disposed may be freely determined. For example, the first photodetector 132 may be disposed on a surface that is not the surface of the substrate 510 where the optical phased array 114 is disposed, for example, on a surface facing the surface where the optical phased array 114 is disposed.

The waveguides 610 and 640 and/or the sub-waveguides 620 illustrated in FIGS. 10 and 11 may be monolithically formed as a plurality of layers are deposited on the substrate 510. However, the present disclosure is not limited thereto. The waveguides 610 and 640 may include an optical fiber.

Figure 12:
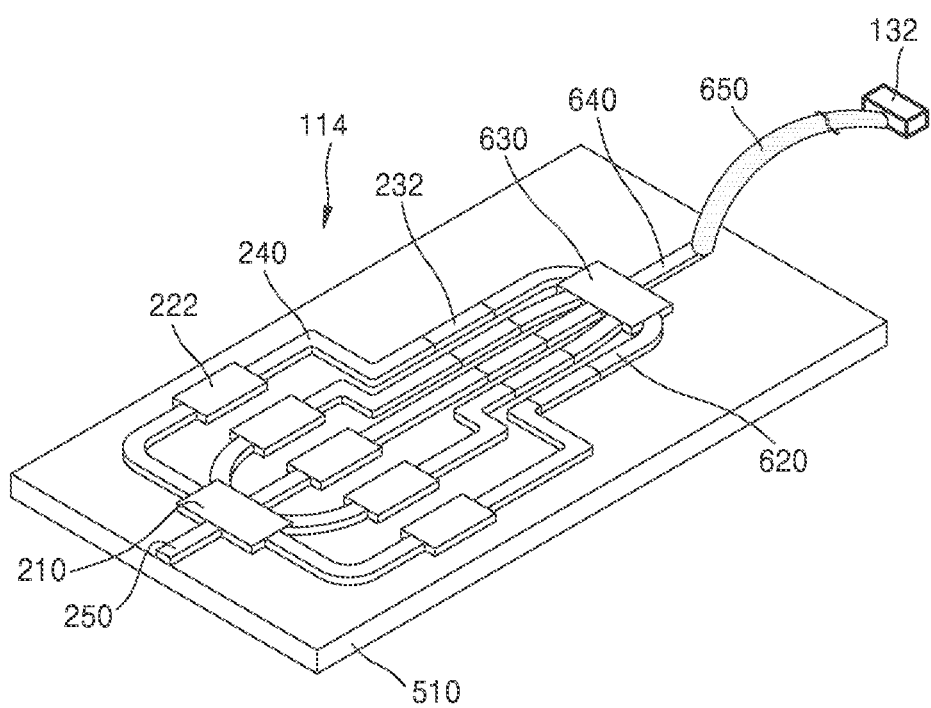
FIG. 12 is a reference drawing for describing a method of connecting the first photodetector and the optical phased array by using an optical fiber, according to an example embodiment.

FIG. 12 is a reference drawing for describing a method of connecting the first photodetector 132 and the optical phased array 114 by using an optical fiber, according to an example embodiment. One end of an optical fiber 650 may be bonded to the substrate 510 where the optical phased array 114 is disposed, and the other end thereof may be disposed to face the first photodetector 132. For example, one end of the optical fiber 650 may be disposed to face an output coupler of the waveguide 640. The first photodetector 132 may be disposed, by using the optical fiber 650, on the substrate 510 that is different from the substrate 510 where the optical phased array 114 is disposed.

Although, in FIGS. 9 to 12, the optical phased array 114 is described as a structure separated from the optical splitter 210, the optical phase modulation array 220, and the antenna array 230, the present disclosure is not limited thereto. The optical phase modulation array 220 and the antenna array 230 may be of an integral type, and may not include the optical splitter 210.

Figure 13:
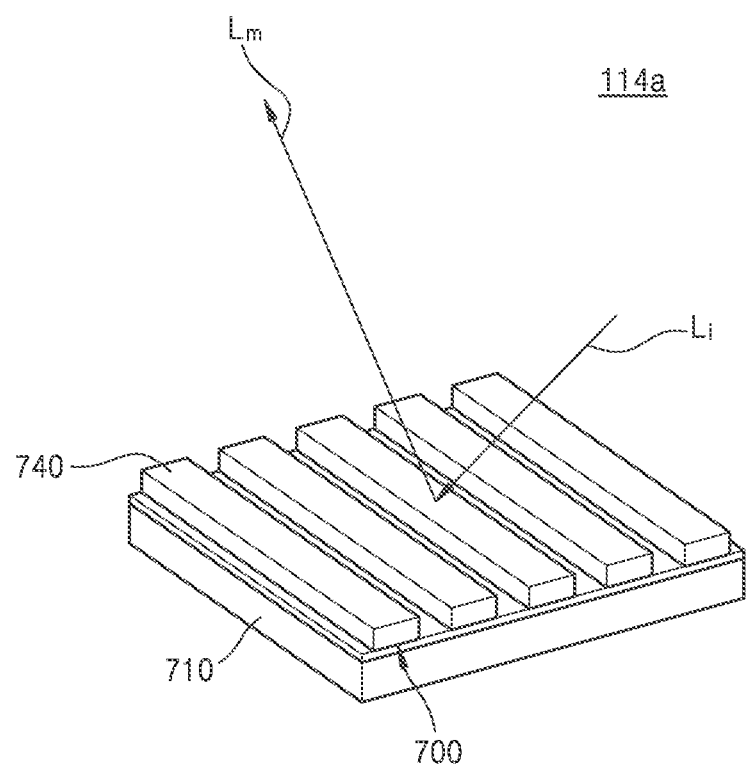
FIG. 13 is a schematic perspective view of an optical phased array according to another example embodiment.

FIG. 13 is a schematic perspective view of an optical phased array 114a according to another example embodiment. Referring to FIG. 13, the optical phased array 114a may include a plurality of antenna resonators 700 that are independently operated. The antenna resonators 700 may include an antenna layer 740 that extends long in a first direction. A plurality of antenna layers 740 may be arranged at a certain interval in a second direction perpendicular to the first direction. In the above structure, incident light Li is reflected and output as the light Lm in a specific direction according to combinations of a voltage applied to the antenna resonators 700. A plurality of antenna resonators may have a nanostructure.

Figure 14:
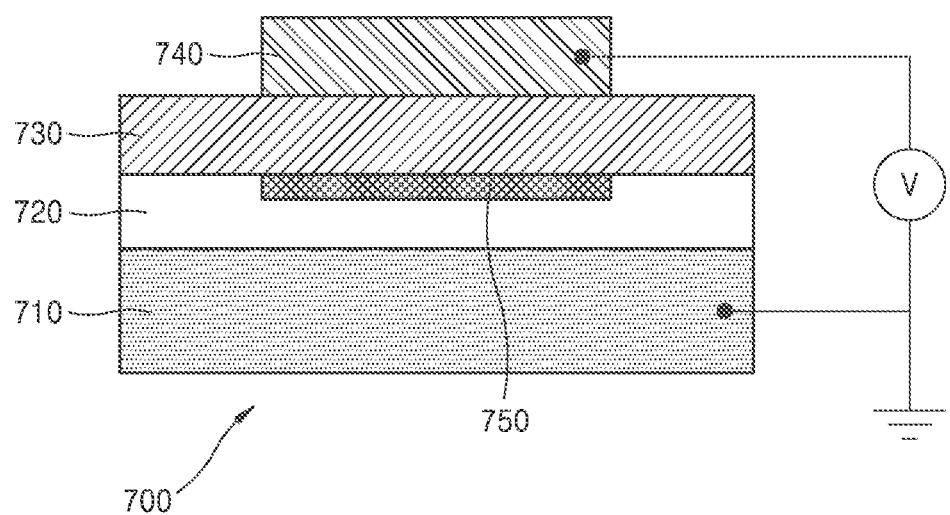
FIG. 14 is a cross-sectional view of an antenna resonator of the optical phased array of FIG. 13.

FIG. 14 is a cross-sectional view of an antenna resonator of the optical phased array 114a of FIG. 13. Referring to FIG. 14, each of the antenna resonators 700 may include an electrode layer 710, an active layer 720 disposed on the electrode layer 710, an insulating layer 730 disposed on the active layer 720, and the antenna layer 740 having a nano size and disposed on the insulating layer 730. Although FIG. 14 illustrates only one antenna layer 740 for convenience of explanation, the optical phased array 114a including the antenna resonators 700 may include a plurality of antenna 740 arranged on the insulating layer 730 by being separated at a regular interval.

The electrode layer 710 may work as a common electrode and may include a material having conductivity. Furthermore, the electrode layer 710 may include a material having reflectivity to the light emitted from the light source 112. For example, the electrode layer 710 may include copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), an alloy thereof, or a metal nanoparticle dispersed thin film such as Au and Ag. Furthermore, the electrode layer 710 may include a carbon nano structure or a conductive polymer material, in addition to metal.

The antenna layer 740, which works as an antenna with respect to light, may generate localized surface plasmon resonance with respect to light of a particular wavelength and capture and discharge energy of the localized surface plasmon resonance. The localized surface plasmon resonance is a phenomenon that a locally very increased electric field is generated on a metal surface according to a phenomenon that free electrons in metal collectively vibrate when light is incident on the metal. The localized surface plasmon resonance may be generally generated on an interface between metal and non-metal. To this end, the antenna layer 740 may include, for example, a metal material having excellent conductivity such as Au, Ag, Cu, Al, or Pt. The size and shape of the antenna layer 740 may vary according to the wavelength of the incident light. For example, the size of the antenna layer 740 may be less than the wavelength of the light emitted from the light source 112. For example, when an operating wavelength is visible light or near infrared light, the width or length of the antenna layer 740 may be about 400 nm or less. Furthermore, the antenna layer 740 may have a simple rod shape or various patterns such as circular, oval, or cross-shaped.

The insulating layer 730 may electrically insulate the antenna layer 740 from the active layer 720 and the electrode layer 710. For example, the insulating layer 730 may include an oxide film such as $HfO_2$, $SiO_2$, $Al_2O_3$, $TiO_2$, or $ZrO$ or a nitride film such as SiNx.

The active layer 720 changes resonance characteristics in the antenna layer 740 as the change density in the active layer 720 is changed by an electrical signal, for example, an electric field formed between the electrode layer 710 and the antenna layer 740. In other words, as a charge accumulation layer or a depletion layer may be generated in the active layer 720 by the electric filed formed between the electrode layer 710 and the antenna layer 740, a resonance condition may be changed and thus the phase of the reflection light may be changed. The active layer 720 may include, for example, a crystal material such as potassium tantalate niobate (KTN), $LiNbO_3$, or lead zirconate titanate (PZT), a ZnO-based oxide such as an indium tin oxide (ITO), an indium zinc oxide (IZO), an aluminum zinc oxide (AZO), a gallium zinc oxide (GZO), or a gallium indium zinc oxide (GIZO), a transition metal nitride such as TiN, ZrN, HfN, or TaN, or a semiconductor material such as Si, a-Si, or group III-V compound semiconductor.

In the optical phased array 114 having the above structure, the charge density in the active layer 720 may vary according to the intensity of the electric field between the electrode layer 710 and the antenna layer 740. As a common voltage is applied to the electrode layer 710, the distribution of the charge density in the active layer 720 may be changed according to the distribution of the voltage applied particularly to a plurality of the antenna layer 740. A change in the charge density in the active layer 720 may change the resonance characteristics of the antenna layer 740, and the changed resonance characteristics may generate a phase shift of the light reflected from the antenna layer 740, thereby changing the phase of the reflected light. Accordingly, as the phase change distribution of the reflected light according to the distribution of voltages applied to the antenna layers 740 arranged close to each other is determined, the proceeding direction of the reflected light may be controlled by the voltages applied to the antenna layers 740. The optical phased array 114a may steer the light in a desired direction by reflecting the incident light in the above method.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LiDAR) device comprising:
    an optical phased array configured to modulate a phase of light incident on the optical phased array and emit the light that is phase-modulated;
    a first photodetector configured to detect, as a reference light, the light emitted from the optical phased array in a first direction toward the first photodetector, and generate a reference signal based on the reference light;
    a second photodetector configured to detect, as a target light including information about an object, the light emitted from the optical phased array in a second direction toward the object, and generate a target signal based on the target light; and
    a processor configured to determine a distance between the LiDAR device and the object based on a cross-correlation between the reference signal and the target signal,
    wherein the optical phased array comprises an optical splitter, a phase modulation array, and an antenna array, and
    wherein the first photodetector is connected to the antenna array via a waveguide that is in contact with the antenna array and the first photodetector and configured to receive the reference light used to determine the distance from the antenna array via the waveguide, and
    wherein the optical splitter, the phase modulation array, the antenna array, the waveguide, and the first photodetector are provided on a same surface of a same substrate.

2. The LiDAR device of claim 1, wherein the optical splitter is configured to split the light incident on the optical phased array, into a plurality of sub-lights,
    the phase modulation array is configured to modulate a phase of each of the plurality of sub-lights, and
    the antenna array configured to emit the plurality of sub-lights that are modulated by the phase modulation array.

3. The LiDAR device of claim 1, further comprising:
    a single analog-to-digital converter (ADC) configured to receive the reference light and the target light and convert the reference light and the target light into a digital reference signal and a digital target signal, respectively.

4. A light detection and ranging (LiDAR) device comprising:
    an optical phased array configured to modulate a phase of light incident on the optical phased array and emit the light that is phase-modulated;
    a first photodetector configured to detect, as a reference light, the light emitted from the optical phased array in a first direction toward the first photodetector, and generate a reference signal based on the reference light;
    a waveguide comprising an area having a width that decreases from the optical phased array toward the first photodetector, and configured to receive the reference light from the optical phased array and output the reference light to the first photodetector;
    a second photodetector configured to detect, as a target light including information about an object, the light emitted from the optical phased array in a second direction toward the object, and generate a target signal based on the target light; and a processor configured to determine a distance between the LiDAR device and the object based on a cross-correlation between the reference signal and the target signal.

5. The LiDAR device of claim 1, wherein the waveguide comprises:
an input coupler configured to allow the reference light received from the optical phased array to be coupled with the waveguide; and
an output coupler configured to output the reference light that passed through the waveguide to the first photodetector.

6. The LiDAR device of claim 5, wherein the input coupler comprises a plurality of sub-input couplers disposed to correspond to respective antennas of the optical phased array.

7. The LiDAR device of claim 1, wherein the optical phased array comprises:
an electrode layer;
an active layer disposed on the electrode layer;
an insulating layer disposed on the active layer; and
an antenna layer disposed on the insulating layer,
wherein the active layer is disposed between the electrode layer and the antenna layer, and configured to have a resonance characteristic that varies according to a voltage applied between the electrode layer and the antenna layer.

8. The LiDAR device of claim 1, wherein the processor is configured to determine the distance between the LiDAR device and the object based on a time difference between a first point in time at which the reference signal is detected and a second point in time at which a cross-correlation function value indicating the cross-correlation between the reference signal and the target signal is greater than or equal to a reference value.

9. The LiDAR device of claim 8, wherein the reference value is a maximum value of the cross-correlation function value.

10. The LiDAR device of claim 9, wherein, when the target signal is f(t) and the reference signal is g(t), the cross-correlation function value is determined by a mathematical expression $\int_{-\infty}^{\infty} f(x)g(t+x)dx$.

11. The LiDAR device of claim 1, wherein the processor is configured to convert the reference signal and the target signal into unipolar signals based on an absolute value of at least one of the reference signal and the target signal.

12. An operating method of a light detection and ranging (LiDAR) device, the operating method comprising:
emitting light that is phase-modulated by a phase modulation array through an antenna array;
receiving, by a photodetector from the antenna array, the light emitted from the antenna array in a first direction toward the photodetector, as reference light that is used to determine a distance between the LiDAR device and an object, wherein the photodetector is connected to the antenna array via a waveguide that is in contact with the antenna array and the photodetector;
detecting, by the photodetector, the light emitted from the antenna array in a second direction toward the object, as a target light including information about the object;
generating a reference signal based on the reference light, and generating a target signal based on the target light; and
determining the distance between the LiDAR device and the object based on a cross-correlation between the reference signal and the target signal,
wherein the phase modulation array, the antenna array, the waveguide, and the photodetector are provided on a same surface of a same substrate.

13. The operating method of claim 12, wherein, the determining the distance comprises, determining the distance based on a time difference between a first point in time at which the reference signal is detected and a second point in time at which a cross-correlation function value indicating the cross-correlation between the reference signal and the target signal is greater than or equal to a reference value.

14. The operating method of claim 13, wherein the reference value is a maximum value of the cross-correlation function value.

15. The operating method of claim 12, further comprising converting the reference signal and the target signal into a digital reference signal and a digital target signal via a single analog-to-digital converter (ADC).

16. The operating method of claim 12, further comprising converting the reference signal and the target signal into unipolar signals based on an absolute value of at least one of the reference signal and the target signal.

17. A distance sensing device comprising:
a light emitter configured to emit light in a first direction toward an object and in a second direction different from the first direction;
an optical phased array configured to modulate a phase of light incident on the optical phased array and emit the light that is phase-modulated;
a light receiver comprising a first photodetector configured to detect the light emitted to the object and reflected from the object as an analog target signal, and a second photodetector configured to detect, directly from the light emitter, the light emitted in the second direction as an analog reference signal;
a single analog-to-digital converter (ADC) configured to receive the analog target signal and the analog reference signal and convert the analog target signal and the analog reference signal to a digital target signal and a digital reference signal, respectively; and
a processor configured to determine a distance between the distance sensing device and the object based on information of a time point at which a cross-correlation between the digital target signal and the digital reference signal is maximized,
wherein the optical phased array comprises an optical splitter, a phase modulation array, and an antenna array, and
wherein the first photodetector is connected to the antenna array via a waveguide that is in contact with the antenna array and the first photodetector and configured to receive the reference light used to determine the distance from the antenna array via the waveguide, and
wherein the optical splitter, the phase modulation array, the antenna array, the waveguide, and the first photodetector are provided on a same surface of a same substrate.

* * * * *